United States Patent Office 3,514,387
Patented May 26, 1970

3,514,387
MODIFICATION OF THE PROPERTIES OF CONJUGATED DIENE POLYMERS IN AN ELECTROSTATIC FIELD
Ralph C. Farrar, Bartlesville, Okla., and Rudolf H. Gaeth, Lake Jackson, Tex., assignors to Phillips Petroleum Company, a corporation of Delaware
No Drawing. Filed Dec. 26, 1967, Ser. No. 693,149
Int. Cl. C08d 1/14
U.S. Cl. 204—168                                    7 Claims

ABSTRACT OF THE DISCLOSURE

The properties of conjugated diene polymers having an organo alkali metal bond are modified by exposing a polymerization reaction mixture containing the polymers to a static electric field prior to deactivating the organo alkali metal initiator used in polymerization.

---

This invention relates to the polymerization of conjugated dienes in the presence of an initiator. In one aspect the invention relates to modifying the properties of conjugated diene polymers having organo alkali metal bonds. In another aspect, the invention relates to controlling the saturation of conjugated diene polymers.

It is known that organo alkali metal initiators may be used for producing polymers of conjugated dienes. One method of polymerization comprises contacting the monomer with the initiator under polymerization conditions, deactivating the initiator and then recovering the polymer.

Polymers of conjugated dienes are highly unsaturated compositions, normally containing about one double bond for each monomer unit in the polymer chain. It is frequently advantageous to reduce this unsaturation in order to increase the stability of the polymer or alter its properties.

Accordingly it is an object of the invention to modify the properties of conjugated diene polymers.

Another object of the invention is to provide a method of reducing the unsaturation of conjugated diene polymers.

Other objects and advantages of the invention will be apparent to one skilled in the art upon consideration of the disclosure and appended claims.

According to the invention, there is provided a method of modifying the properties of conjugated diene polymers having an organo alkali metal bond prepared in the presence of an organo alkali metal initiator comprising exposing the polymerization reaction mixture containing such a polymer to a strong static electric field before deactivating the initiator. Any effective strength of direct current electric field can be utilized; the maximum field strength being determined by arcing or current flow. The length of such exposure is a function of field strength, the characteristics of the polymerization reaction mixture and the degree to which it is desired to modify the properties of the polymer.

Generally, exposure of a polymerization reaction mixture to an electric field of from about 100 to about 50,000 volts per centimeter for a time in the range of about 5 minutes or less to 100 hours is sufficient to obtain the desired modifications of polymer properties. The greatest amount of modification is of course obtained with the highest operable field strength.

In one embodiment of the invention, conjugated dienes are polymerized while simultaneously being exposed to the action of the static electric field. This can be easily accomplished by introducing the polymerization reaction components into a cell having plates across which a potential is applied. In another embodiment of the invention, the polymerization reaction mixture is exposed to the electric field after completion of the polymerization reaction and prior to deactivation of the organo alkali metal initiator. The properties modified in accordance with the invention include inherent viscosity, gel, and degree of unsaturation.

In general, the polymers which are modified according to the invention are homopolymers and copolymers of conjugated 1,3-dienes containing from 4 to 12 carbon atoms per molecular and preferably those containing 4 to 8 carbon atoms per molecule. Representative examples of suitable conjugated dienes which can be employed include:

1,3-butadiene
isoprene
2,3-dimethyl-1,3-butadiene
1,3-pentadiene (piperylene)
2-methyl-3-ethyl-1,3-butadiene
3-methyl-1,3-pentadiene
2-methyl-3-ethyl-1,3-pentadiene
2-ethyl-1,3-pentadiene
1,3-hexadiene
2-methyl-1,3-hexadiene
1,3-heptadiene
3-methyl-1,3-heptadiene
1,3-octadiene
3-butyl-1,3-octadiene
3,4-dimethyl-1,3-hexadiene
3-n-propyl-1,3-pentadiene
4,5-diethyl-1,3-octadiene
2-phenyl-1,3-butadiene
2,3-diethyl-1,3-butadiene
2,3-di-n-propyl-1,3-butadiene
2-methyl-3-isopropyl-1,3-butadiene and the like. Conjugated dienes containing halogen and alkoxy substituents can also be employed, such as chloroprene, fluoroprene, 2-methoxy-1,3-butadiene, 2-ethoxy-3-ethyl-1,3-butadiene and 2-ethoxy-3-methyl-1,3-hexadiene.

The invention is applicable to the polymerization of the above-defined conjugated dienes either alone or in admixture with each other and/or with one or more other unsaturated compounds preferably containing an active $CH_2=C<$ group which are copolymerizable therewith. Examples of compounds containing an active $CH_2=C<$ group which are copolymerizable with one or more conjugated dienes are styrene, acrylonitrile, methacrylonitrile, methylacrylate, methylmethacrylate, 2-methyl-5-vinylpyridine, 2-vinylpyridine, 4-vinylpyridine, 3-vinyltoluene, 1-vinylnaphthalene, 2-vinylnaphthalene, 4-vinyltoluene, and the like.

The initiator compositions which can be employed in carrying out the invention include organo alkali metal compounds. The useful alkali metals include lithium, sodium, potassium, rubidium and cesium. Organolithium compounds are preferred. The term "organolithium compound," as used herein, includes the various lithium hydrocarbons, especially the mono- and polylithium hydrocarbons which are active for the polymerization of conjugated dienes to polymers. The organolithium compounds that can be employed in the invention ordinarily contain from 1 to 4 lithium atoms per molecule. These organolithium compounds can be prepared in a hydrocarbon or polar medium in several ways, for example, by replacing halogen in an organic halide with lithium or by the direct addition of lithium to a carbon-carbon double bond or by reacting an organic halide with a lithium containing compound. Other alkali metal initiators, such as sodium, can be prepared in a similar manner.

The compounds from which the organolithium compounds are prepared generally contain 1 to 20, inclusive, carbon atoms per molecule and when the parent compound is an aromatic hydrocarbon it can contain alkyl substituents. The alkyl substituents can contain from 1 to 6 carbon atoms but the total carbon atoms in each alkyl group should not exceed 6 and no more than 3 alkyl groups should be present per molecule.

Halogen containing organolithium compounds such as 3 - bromo - phenyllithium, 3 - bromo - 1 - naphthyllithium, 3 - chloro - phenyllithium, 3 - fluoro - 1 - naphthyliniumlithium, and the like, can also be utilized in the practice of the invention.

The temperature employed for polymerization according to the invention is generally in the range of from —100 to 150° C., preferably from —75 to 75° C. The particular temperature employed depends on both the monomer and the initiators used in the polymerization. The pressure employed during polymerization need be only that necessary to maintain the material substantially in a liquid phase. The amount of initiator employed during polymerization will vary appreciably but generally will be in the range of from about 0.1 to about 200 milligram atoms of lithium per 100 grams of monomer with the preferred range being from about 0.25 to about 60 milligram atoms of lithium per 100 grams of monomer.

The polymerization of the monomer in the presence of the organolithium initiators according to the invention is preferably carried out in a suitable diluent, such as benzene, toluene, cyclohexane, methylcyclohexane, xylene, and the like. Generally, the diluent is selected from a hydrocarbon, for example paraffins, cycloparaffins and aromatics containing from 4 to 10, inclusive, carbon atoms per molecule.

The polymerization reaction can be "shortstopped" or the initiator deactivated by any conventional method, for example by adding hydrochloric acid to the reaction mixture. The polymerization reaction mixture can also be treated with alcohol or other reagent to inactivate the catalyst or initiator and/or precipitate polymer. Antioxidants such as 2,2' - methylene - bis(4 - methyl - 6 - tert - butylphenol) can also be added to the polymerization mixture along with the shortstop.

The polymer can be recovered by any well known technique such as coagulation, removal of the diluent by evaporation or the like. Inorganic initiator residues can be separated from the polymer by well known methods.

While it is not intended to limit the polymer modification according to the invention to any particular reaction mechanism, it is believed to include hydrogen transfer, metallation, cross-linking, cyclization, and other affects brought about by the influence of the electric field. The modified products are in general more stable and have greater resistance to heat than similar polymers that have not been exposed to an electric field. The invention provides a method for obtaining a wide variety of products, depending upon the nature of the starting polymer and the degree to which it is modified. Modified products vary from rubbers to plastics and are useful as thermoplastic molding materials and as coating compositions.

The advantages of this invention are further illustrated by the following examples. The reactants and their properties and other specific conditions are presented as being typical and should not be construed to unduly limit the invention.

EXAMPLE I

The effect of a strong electric field on the polymerization of butadiene in the presence of sec-butyllithium was determined. The polymerization recipe was as follows:

1,3-butadiene, parts by weight—100
Cyclohexane (diluent), parts by weight—600
sec-butyllithium, mhm.—1.6 mhm.=gram millimoles per 100 grams monomer.

The recipe components were mixed under an atmosphere of nitrogen. A cylindrical high voltage capacitance cell approximately 12 centimeters in diameter having wall plates spaced 1 centimeter apart was filled with a portion of the mixture and the remainder was reserved as a control. A potential of 20 kilovolts was imposed across the cell. Polymerization in the cell and also in the control run was conducted at room temperature (approximately 78° F.) for 16 hours. Both runs were terminated by the addition of a 10 weight per cent solution of 2,2'-methylene-bis(4 - methyl - 6 - tert - butylphenol) in a mixture of equal volumes of isopropyl alcohol and toluene.

The polymers were coagulated in isopropyl alcohol, separated, and dried. Conversion in each run was quantitative. Results were as follows:

| | Polymerization product | |
|---|---|---|
| | In an electric field | Control run |
| Inherent viscosity (1) | 1.95 | 1.58 |
| Gel, percent (2) | 12 | 3 |
| Unsaturation, percent (3) | 48.9 | 92.7 |

[1] Inherent viscosity was determined by the method outlined in U.S. Pat. No. 3,278,508, column 20, note a.
[2] Gel percent was determined by the method outlined in U.S. Pat. No. 3,278,508, column 20, note b.
[3] Unsaturation percent was determined by the method outlined in U.S. Pat. No. 3,299,016, column 9, lines 55 ff.

The significant reduction in unsaturation that occurred when polymerization was conducted in the cell is indicative of cyclization. This polymer also had a higher inherent viscosity and gel content than the polymer prepared by the conventional process. Because of the reduced unsaturation, the polymer prepared by exposure to the electric field is much more thermally stable.

EXAMPLE II

The effect of a strong electric field on an unterminated polymerization mixture prepared by polymerizing butadiene in the presence of n-butyllithium was determined. The following recipe was employed for the polymerization of butadiene:

1,3-butadiene, parts by weight—100
Cyclohexane, parts by weight—780
n-Butyllithium, mhm.—2
Temperature, °F.—158
Time, hours—3

The reaction was conducted in an atmosphere of nitrogen. Following polymerization, a portion of the unterminated reaction mixture was transferred into a capacitance cell utilized in Example I which again was charged with 20 kilovolts. The material in the cell was maintained at room temperature for 16 hours. The treated and untreated polymerization mixtures were terminated with antioxidant solution and these were coagulated, separated, and dried as set forth in Example I.

The treated polymer, having been exposed to the electric field, had an unsaturation of 86.7 percent while the untreated polymer had 95.1 percent unsaturation.

The example demonstrates the operability of that embodiment wherein the reaction mixture is exposed to the electric field after substantial completion of the polymerization reaction but before the deactivation of the initiator.

Reasonable modification and variation are within the scope of the invention which sets forth a novel method of modifying the properties of conjugated diene polymers.

That which is claimed is:

1. In a method of polymerizing a conjugated diene, including contacting said diene with an organic alkali metal initiator, permitting said diene to polymerize, whereby to form a polymer having organo alkali metal bonds and adding a deactivator to the reaction mass when the desired degree of polymerization is observed; the improvement wherein said reaction mass is subjected to an electrostatic field having a field strength of 100 to 50,000 volts per centimeter for a sufficient time period of up to about 100 hours prior to the adding of said deactivator.

2. The method of claim 1 wherein said static field strength is from about 100 to 50,000 volts per centimeter and said time period is from about 5 minutes to 100 hours.

3. The method of claim 1 wherein said organo alkali metal initiator comprises an organolithium initiator.

4. The method of claim 1 wherein said exposure is simultaneous with said diene polymerization reaction.

5. The method of claim 1 wherein said exposure is subsequent to the completion of said polymerization reaction and prior to deactivation of said initiator.

6. The method of claim 1 wherein said polymer comprises polybutadiene and said initiator comprises sec-butyllithium.

7. The method of claim 1 wherein said polymer comprises polybutadiene and said initiator comprises n-butyllithium.

References Cited

UNITED STATES PATENTS 3,321,391  5/1967  Warfield et al. _____ 204—165

ROBERT K. MIHALEK, Primary Examiner

U.S. Cl. X.R.

260—94.2